US008706889B2

(12) United States Patent
Marquardt et al.

(10) Patent No.: US 8,706,889 B2
(45) Date of Patent: Apr. 22, 2014

(54) MITIGATING CONNECTION IDENTIFIER COLLISIONS IN A COMMUNICATION NETWORK

(75) Inventors: David R. Marquardt, Round Rock, TX (US); Prashant A. Paranjape, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 831 days.

(21) Appl. No.: 12/879,786

(22) Filed: Sep. 10, 2010

(65) Prior Publication Data

US 2012/0066399 A1 Mar. 15, 2012

(51) Int. Cl.
G06F 15/16 (2006.01)

(52) U.S. Cl.
USPC ............................ 709/228; 709/203; 709/227

(58) Field of Classification Search
USPC .......................................... 709/203, 227–228
See application file for complete search history.

(56) References Cited

U.S. PATENT DOCUMENTS

| 6,424,992 | B2 * | 7/2002 | Devarakonda et al. | 709/203 |
|---|---|---|---|---|
| 7,140,025 | B1 * | 11/2006 | Dillow et al. | 719/313 |
| 7,363,652 | B2 * | 4/2008 | Yang et al. | 726/11 |
| 7,532,577 | B2 * | 5/2009 | Park et al. | 370/241 |
| 7,814,218 | B1 * | 10/2010 | Knee et al. | 709/230 |
| 8,151,278 | B1 * | 4/2012 | Knee et al. | 719/318 |
| 8,341,272 | B2 * | 12/2012 | Kleo | 709/227 |
| 2004/0111729 | A1 * | 6/2004 | Moore et al. | 719/318 |
| 2004/0202117 | A1 * | 10/2004 | Wilson et al. | 370/310 |
| 2004/0203835 | A1 * | 10/2004 | Trottier et al. | 455/454 |
| 2005/0193127 | A1 * | 9/2005 | Moore et al. | 709/228 |
| 2006/0075119 | A1 * | 4/2006 | Hussain et al. | 709/227 |
| 2006/0126640 | A1 | 6/2006 | Sood et al. | |
| 2006/0168240 | A1 * | 7/2006 | Olshefski | 709/227 |
| 2006/0259626 | A1 * | 11/2006 | Stone-Kaplan et al. | 709/227 |
| 2007/0130324 | A1 * | 6/2007 | Wang | 709/224 |
| 2008/0285571 | A1 * | 11/2008 | Arulambalam et al. | 370/400 |
| 2009/0077233 | A1 * | 3/2009 | Kurebayashi et al. | 709/224 |
| 2009/0323682 | A1 | 12/2009 | Winter | |
| 2010/0088763 | A1 | 4/2010 | Yoo | |
| 2010/0149973 | A1 * | 6/2010 | Krupp et al. | 370/230 |

(Continued)

OTHER PUBLICATIONS

Gont, Fernando et al., "Port Randomization", *Transport Area Working Group*http://www.gont.com.ar/drafts/port-randomization/draft-ietf-tsvwg-port-randomization-03.html (Date Obtained from the Internet Jul. 16, 2010) Expires: Sep. 12, 2009 Mar. 11, 2009, 19 pages.

(Continued)

*Primary Examiner* — Anthony Mejia
(74) *Attorney, Agent, or Firm* — DeLizio Gilliam, PLLC

(57) ABSTRACT

A new instance of a connection that is in the wait state can be established while mitigating connection identifier collisions. Based on a connection identifier in a connection request received at a server from a client, it is determined that a previous instance of a connection represented by the connection identifier is in a wait state. An acknowledgement message comprising wait state parameters associated with the connection identifier and original connection parameters associated with the previous instance of the connection in the wait state is provided from the server to the client. In response, the server receives a compliance message comprising updated wait state parameters and updated connection parameters from the client. The new instance of the connection represented by the connection identifier that previously represented the previous instance of the connection is established based, at least in part, on the updated wait state parameters and the updated connection parameters.

14 Claims, 8 Drawing Sheets

(56) References Cited

U.S. PATENT DOCUMENTS

2010/0306256 A1* 12/2010 Blackman ................ 707/770
2011/0138067 A1*  6/2011 Vashaw et al. ............ 709/229
2011/0153838 A1*  6/2011 Belkine et al. ............ 709/227
2012/0036231 A1*  2/2012 Thakur et al. ............ 709/220
2013/0007223 A1*  1/2013 Luby et al. ................ 709/219

OTHER PUBLICATIONS

Gont, Fernando, "Security Assessment of the Transmission Control Protocol (TCP)", *Network Working Group* Feb. 20, 2009, 137 pages.

* cited by examiner

MITIGATING CONNECTION IDENTIFIER COLLISIONS IN A COMMUNICATION NETWORK

BACKGROUND

Embodiments of the inventive subject matter generally relate to the field of networking protocols and, more particularly, to mitigating connection identifier collisions in a communication network.

Transmission Control Protocol (TCP) is a connection-oriented transport protocol that provides reliable data communication between two network devices (e.g., a server and a client). When the server actively terminates a TCP connection between the server and the client, the client closes a client socket on which the connection was established (e.g., considers the connection to be in a CLOSED state). However, the server does not close a corresponding server socket. Instead, the server considers the connection to be in a TIME_WAIT state for a predefined time interval. In doing so, the server can protect against receiving and processing stale messages transmitted via a previous instance of the connection. If prompted, the server can establish a new instance of the connection after the predefined time interval associated with the TIME_WAIT elapses.

SUMMARY

Various embodiments for mitigating connection identifier collisions in a communication network are described herein. In one embodiment, it is determined, based on a connection identifier in a connection request received at a server from a client, that a previous instance of a connection represented by the connection identifier is in a wait state. Wait state parameters associated with the connection identifier and original connection parameters associated with the previous instance of the connection in the wait state are determined. An acknowledgement message that comprises the wait state parameters and the original connection parameters is provided from the server to the client. In response to the acknowledgement message, a compliance message that comprises updated wait state parameters and updated connection parameters is received at the server from the client. A new instance of the connection represented by the connection identifier that previously represented the previous instance of the connection is established with the client based, at least in part, on the updated wait state parameters and the updated connection parameters.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
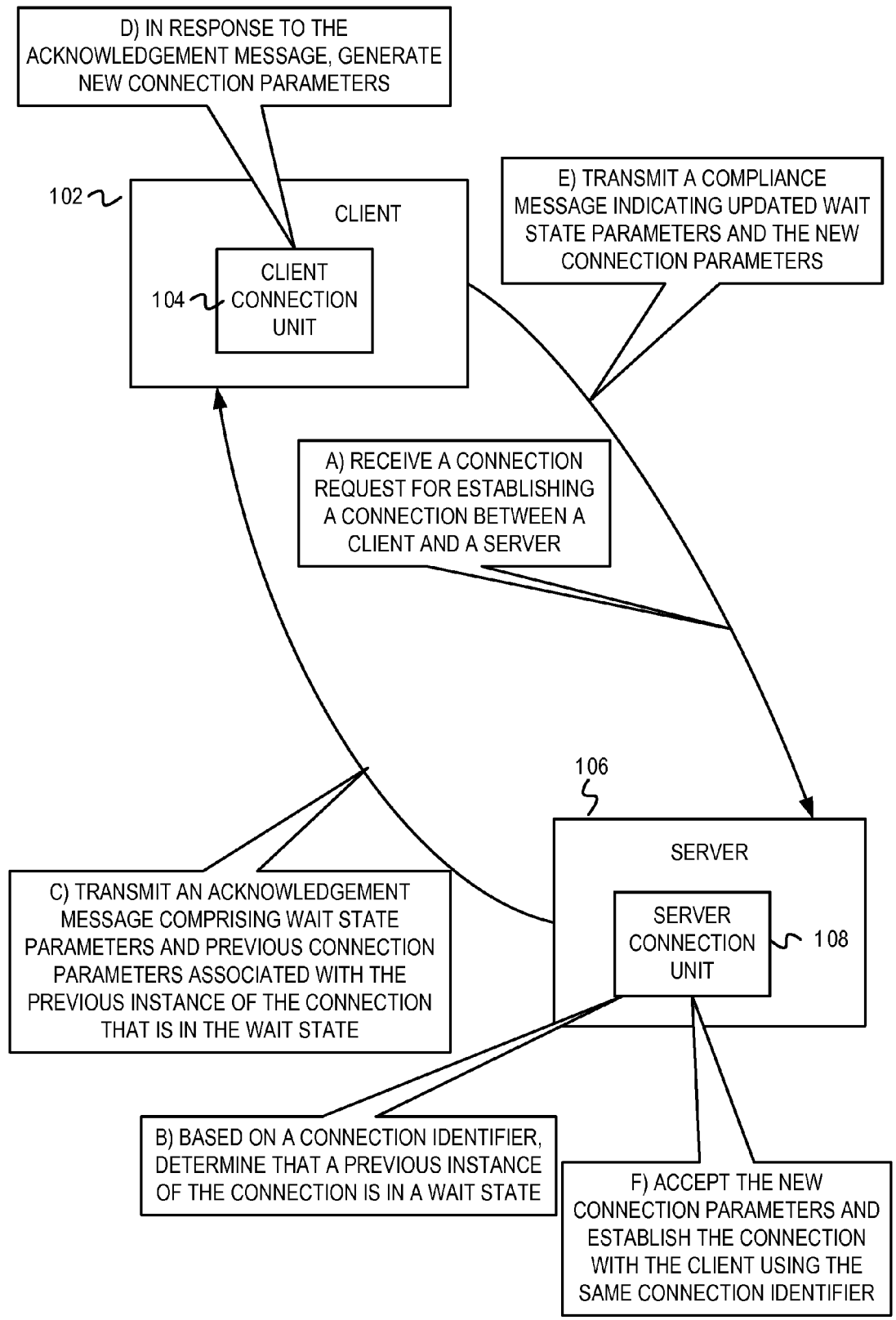
FIG. 1 is an example conceptual diagram illustrating example operations for mitigating collisions between different instances of a connection with the same connection identifier.

The description that follows includes exemplary systems, methods, techniques, instruction sequences, and computer program products that embody techniques of the present inventive subject matter. However, it is understood that the described embodiments may be practiced without these specific details. For instance, although examples refer to establishing a new instance of a TCP connection when a previous instance of the TCP connection is in a wait state, in other embodiments, operations described herein for establishing a new instance of a connection in the wait state can be extended to other communication standards and protocols. In other instances, well-known instruction instances, protocols, structures, and techniques have not been shown in detail in order not to obfuscate the description.

When a server performs an active close of a TCP connection between the server and a client, the server moves the connection to a wait state. Typically, the server does not establish a new instance of the connection, represented by the same connection identifier as the connection in the wait state ("previous instance of the connection"), until a wait state time interval has elapsed. This can be problematic in various scenarios, such as where the client establishes connections with the server (e.g., a remote web server) at a high rate and closes the established connections at a high rate because the server will maintain all the closed connections in the wait state for the wait state time interval. If the rate at which connections are established and terminated is high, it is possible for all ephemeral ports of the client and/or the server to be part of connections that are in the wait state, thus preventing the client from establishing new connections with the server.

A process for establishing a new instance of a connection that is in the wait state can be implemented on the server and the client. Prior to moving the previous instance of the connection to the wait state, a wait state connection identifier can be generated and associated with the previous instance of the connection to be moved to the wait state. On receiving a connection request for establishing the new instance of the connection in the wait state, the wait state connection identifier and other wait state parameters can be transmitted to the client to indicate that the previous instance of the connection is in the wait state. Previous connection parameters associated with the previous instance of the connection can also be transmitted to the client. The client, in turn, can generate new connection parameters (e.g., that are greater than the previous connection parameters) and can update the received wait state parameters to acknowledge that the previous instance of the connection is in the wait state. The client can transmit the new connection parameters and the updated wait state parameters to the server. On receiving the new connection parameters and the updated wait state parameters, the server can discard the previous instance of the connection that was in the wait state and can establish the new instance of the connection. The server can establish the new instance of the connection regardless of whether the time wait interval associated with the previous instance of the connection has elapsed. Such a technique for establishing a new instance of a connection that is in the wait state can allow the client to efficiently reconnect to the server using the same connection identifier as the previous instance of the connection. This can also preclude the server from rejecting a connection request where the previous instance of the connection is in the wait state.

FIG. 1 is an example conceptual diagram illustrating example operations for mitigating collisions between different instances of a connection with the same connection identifier. FIG. 1 depicts a client 102 and a server 106. The client 102 comprises a client connection unit 104, and the server 106 comprises a server connection unit 108. In one implementation, the client connection unit 104 and the server connection unit 108 may be implemented as part of a transport layer. The client connection unit 104 and the server connection unit 108 execute operations for efficiently mitigating connection identifier collisions and establishing a connection between the client 102 and the server 106, as will be described in stages A-F below.

At stage A, the server connection unit 108 receives a connection request for establishing a connection between the client 102 and the server 106. The server connection unit 108 can receive the connection request along with a connection identifier that represents the connection. The connection identifier comprises a combination of five parameters (i.e., a five-tuple) associated with the connection—a source port at which the client 102 initiates the connection, a destination port at the server 106, a source address (e.g., an address of the client 102), a destination address (e.g., an address of the server 106), and a connection protocol. The connection protocol can indicate a communication protocol that is supported by the client 102 and the server 106 for communication on the connection to be established. In one example, the connection protocol can be Transmission Control Protocol (TCP).

At stage B, based on a connection identifier, the server connection unit 108 determines that a previous instance of the connection is in a wait state. As described above, when a connection between the server 106 and the client 102 is terminated (because the server actively closes the connection), the server connection unit 108 moves the connection to be terminated into a wait state to ensure that old messages transmitted on the connection to be terminated are discarded if received. The time interval for which the connection is in the wait state ("wait state time interval") may be determined based on a maximum segment lifetime (MSL). Typically, for TCP, the wait state time interval is 2*MSL. On receiving the connection request, the server connection unit 108 can determine a connection identifier from the connection request. In other words, the server connection unit 108 determines the source port, the destination port, the source address, the destination address, and the connection protocol as indicated in the connection request. Prior to establishing the connection with the client 102, the server connection unit 108 determines whether the connection identifier determined from the connection request is the same as a connection identifier of a connection that is currently in the wait state. In other words, the server connection unit 108 determines whether a previous instance of the connection (with the same connection identifier as a current requested instance of the connection) is in the wait state. At stage B, the server connection unit 108 determines that the previous instance of the connection is in the wait state.

At stage C, the server connection unit 108 transmits an acknowledgement message comprising wait state parameters and previous connection parameters associated with the previous instance of the connection that is in the wait state. The server connection unit 108 transmits the acknowledgement message to acknowledge receipt of the connection request. As part of the acknowledgement message, the server connection unit 108 transmits the wait state parameters and the previous connection parameters associated with the previous instance of the connection. The wait state parameters comprise a wait state code, a flag, and a wait state connection identifier. The wait state code and the flag can indicate that the previous instance of the connection that is in the wait state. The wait state connection identifier may be a random number that is generated and is associated with the connection identifier to indicate that the previous instance of the connection is in the wait state. The previous connection parameters comprise a sequence number and a timestamp associated with the previous instance of the connection. In one implementation, if TCP is used as the connection protocol, a TCP options field may be used to transmit the wait state parameters and the previous connection parameters. The wait state code may be a TCP options code that indicates that subsequent fields will comprise the wait state parameters and the previous connection parameters.

At stage D, in response receiving the acknowledgement message, the client connection unit 104 generates new connection parameters. On receiving the acknowledgement message, the client connection unit 104 can read the wait state parameters and can accordingly determine that the previous instance of the connection is in the wait state. The client connection unit 104 generates the new connection parameters based, in part, on the previous connection parameters. For example, the client connection unit 104 generates a new initial sequence number (ISN) that is greater than a previous sequence number indicated in the previous connection parameters. As another example, the client connection unit 104 generates a new timestamp that is greater than a previous timestamp indicated in the previous connection parameters. As long as the new connection parameters are greater than the previous connection parameters, the client connection unit 104 can use various techniques to generate the new connection parameters. For example, the client connection unit 104 may randomly generate the new connection parameters, may sequentially increment the previous connection parameters to yield the new connection parameters, or may generate the new connection parameters in accordance with a predefined algorithm. Operations of the client connection unit 104 for generating the new connection parameters will further be described with reference to FIG. 5.

At stage E, the client connection unit 104 transmits a compliance message indicating updated wait state parameters and the new connection parameters. The client connection unit 104 transmits the compliance message to indicate receipt of the acknowledgement message from the server connection unit 108. The client connection unit 104 updates the wait state parameters to indicate that the client connection unit 104 recognizes the wait state parameters and understands that the previous instance of the connection is in the wait state. For this, the client connection unit 104 can update the flag to a predetermined value (as will be further described below). The client connection unit 104 can transmit the wait state code and the wait state connection identifier received from the server connection unit 108 in the acknowledgement message. The wait state code, the wait state connection identifier, and the updated flag together constitute the updated wait state parameters. As will be described in FIGS. 4-5, the client connection unit 104 can generate and transmit the compliance message comprising the updated wait state parameters and the new connection parameters (determined at stage D).

At stage F, the server connection unit 108 accepts the new connection parameters and establishes a new instance of the connection with the client 102 using the same connection identifier as the previous instance of the connection in the wait state. The server connection unit 108 can receive the compliance message from the client connection unit 104 and can determine whether the compliance message comprises the updated wait state parameters. In FIG. 1, the server connection unit 108 determines that the compliance message comprises the updated wait state parameters and consequently that the client connection unit 104 acknowledges that the previous instance of the connection is in the wait state. Accordingly, the server connection unit 108 can read the wait state connection identifier and the updated wait state flag, determine previously recorded previous connection parameters, read the new connection parameters from the compliance message, and determine whether the new connection parameters are greater than the previous connection parameters. As will be further described below, based on the updated wait state parameters and the new connection parameters, the server connection unit 108 can accept the new connection parameters, can overwrite the previous connection parameters, and can establish the new instance of the connection between the server 106 and the client 102 irrespective of the remaining time wait interval. In other words, the server connection unit 108 can discard the previous instance of the connection that was in the wait state and can establish the new instance of the connection between the server 108 and the client 102 with the new connection parameters and the same connection identifier. The server 108 and the client 102 can then communicate via the established new instance of the connection using the same connection identifier as the previous instance of the connection that was in the wait state.

Figure 2:
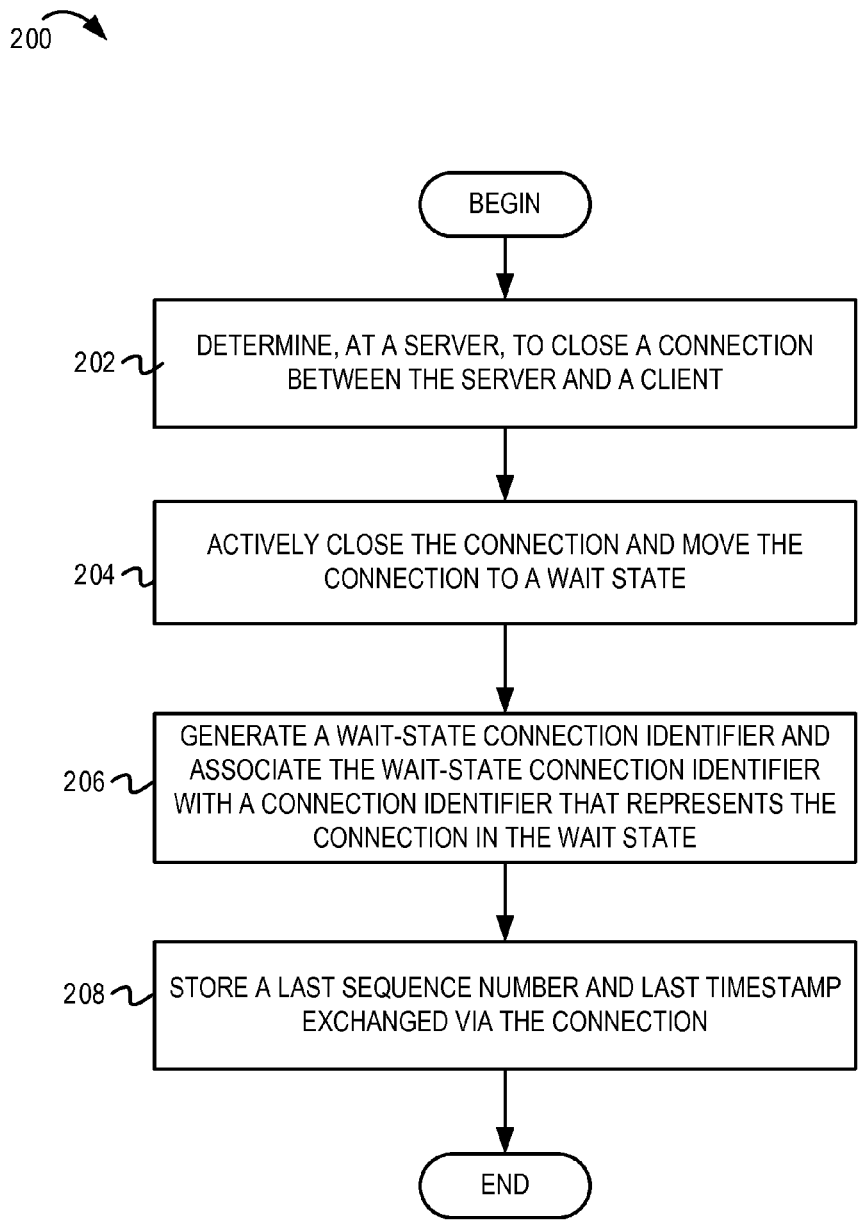
FIG. 2 is a flow diagram illustrating example operations of a server for recording connections in a wait state.

FIG. 2 is a flow diagram ("flow") 200 illustrating example operations of a server for recording connections in a wait state. The flow begins at block 202.

It is determined, at a server, that a connection between the server and a client is to be closed (202). For example, the server connection unit 108 of FIG. 1 determines that the connection between the server 106 and the client 102 is to be closed. The server connection unit 108 can determine that the connection is to be closed in response to a request from the client 102 to terminate the connection. In one implementation, the connection may be Transmission Control Protocol (TCP) connection. The server connection unit 108 and the client connection unit 104 can execute connection close handshaking operations to terminate the connection between the client 102 and the server 106. In some implementations, the server connection unit 108 may determine to close the connection based on receiving a request to abort the connection (e.g., on receiving an ABORT signal) from the client 102. It is noted, however, that in some implementations, the server 106 may generate the request to terminate the connection between the server 106 and the client 102, as will be described below. The flow continues at block 204.

The connection is actively closed and the connection is moved to a wait state (204). For example, the server connection unit 108 actively closes the connection and, therefore, moves the connection to the wait state. The client connection unit 104 (i.e., a passive end point of the connection) simply closes the connection. Prior to terminating the connection between the server 108 and the client 102, the server connection unit 108 indicates that the connection is in a wait state. For a TCP connection, the server connection unit 108 can indicate that the connection is in a TIME_WAIT state to ensure that all data packets transmitted by the client 102 (e.g., packets transmitted prior to the request to close the connection) were received at the server 106. The server connection unit 108 can also indicate that the connection is in the TIME_WAIT state to receive and to subsequently discard stale or duplicate messages (also known as wandering duplicates) that have not yet been delivered to the server 106. A duration for which the connection to be closed is in the TIME_WAIT state may be defined as twice a maximum segment lifetime (MSL) of a TCP message. The MSL indicates a time interval for which a TCP message can exist on the communication network. For example, if the client 102 establishes a TCP connection with the server 106 and the server 106 actively closes the connection, the connection is considered to be in the TIME_WAIT state at the server 106 for at least 2*MSL. In one implementation, the MSL can be configured to be 2 minutes. In other implementations, however, the MSL can be configured to be any suitable time interval. It is noted that although the connection is considered to be in the TIME_WAIT state at the server 106, the connection is deemed to be closed (e.g., in a CLOSE state) at the client 102. It is further noted that, in some implementations, the client connection unit 104 may actively close the connection and move the connection to the wait state and the server connection unit 108 may passively close the connection, as will be described below. The flow continues at block 206.

A wait-state connection identifier is generated and the wait-state connection identifier is associated with a connection identifier that represents the connection in the wait state (206). For example, the server connection unit 108 generates the wait-state connection identifier. In some implementations, the wait state connection identifier is a random (or a pseudo-random) number that can be generated in response to determining that the connection is the wait state. The server connection unit 108 associates the wait-state connection identifier with the connection identifier of the connection in the wait state. The connection identifier is a combination of five parameters associated with the connection including a source port, a destination port, a source address, a destination address, and a connection protocol. The source port and the destination port represent end points of the connection. In this case, the source port represents a port (e.g., one of multiple client ports) at which the client 102 transmits/receives packets, while the destination port represents a port (e.g., one of multiple server ports) at which the server 106 transmits/receives packets. The source port and the destination port represent addresses (e.g., medium access control (MAC) address, network address, etc.) of the client 102 and the server 106, respectively. The connection protocol can represent the transport layer protocol implemented by the server 106 and the client 102. As one example, the connection protocol may TCP. As another example, the connection protocol can be any suitable connection protocol. The flow continues at block 208.

A last sequence number and last timestamp exchanged via the connection is stored (208). For example, the server connection unit 108 stores the last sequence number transmitted by the client 102 and the last timestamp exchanged with the client 102 via the connection. The sequence number is typically used in a TCP connection to identify an order in which data bytes are transmitted to enable accurate reconstruction, regardless of fragmentation, re-ordering, or packet loss. For every packet that is transmitted, the sequence number is incremented. The timestamp enables computation of a round-trip time between the client 102 and the server 106 to ensure that received packets are current and to prevent replay attacks. From block 208, the flow ends.

Figure 3:
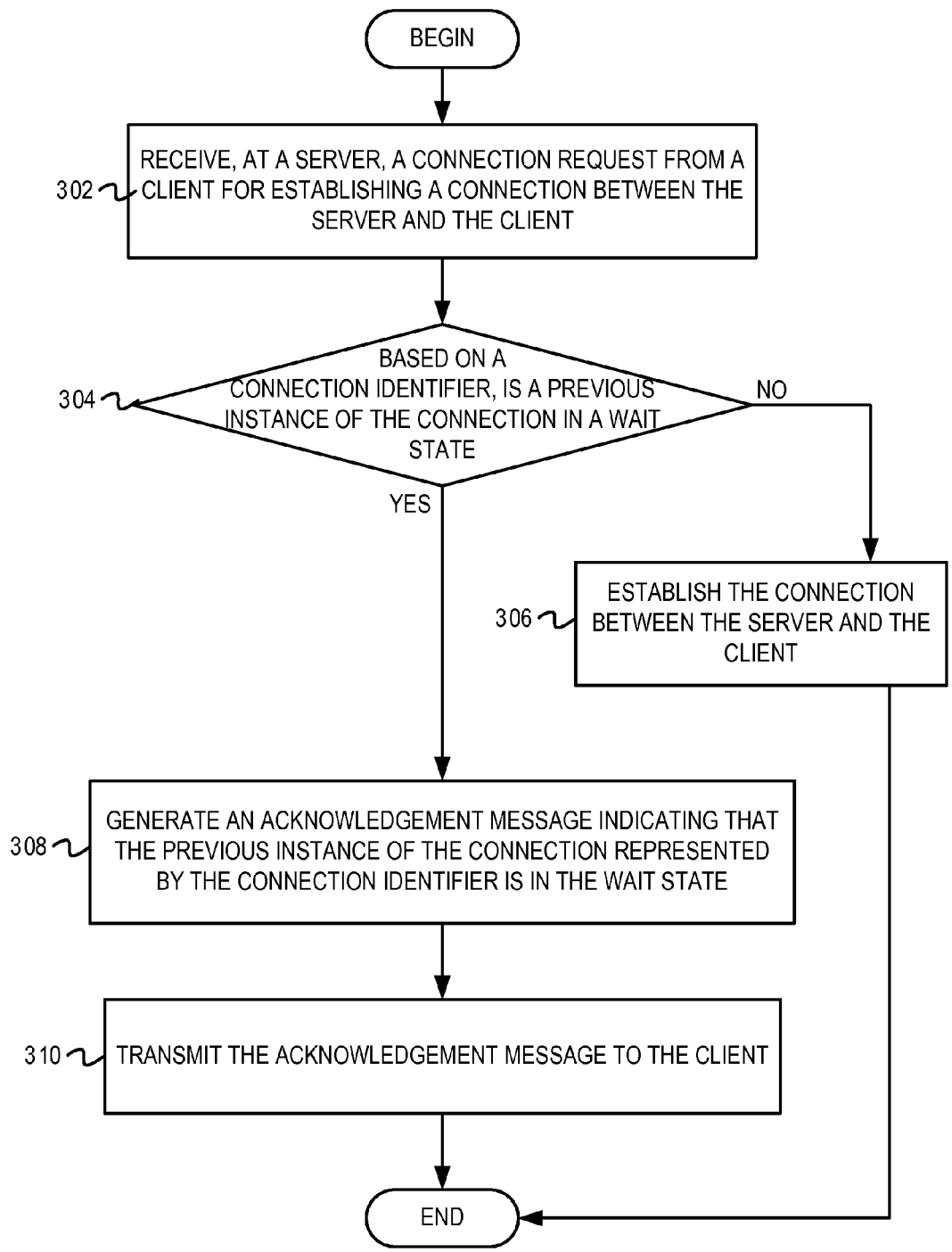
FIG. 3 is a flow diagram illustrating example operations of a server for identifying a connection in a wait state.

FIG. 3 is a flow diagram 300 illustrating example operations of a server for identifying a connection in a wait state. The flow 300 continues at block 302.

A connection request from a client for establishing a connection between a server and the client is received at the server (302). For example, the server connection unit 108 of FIG. 1 receives the connection request from the client 102. In one implementation, the server connection unit 108 may receive a SYN message from the client 102 to establish a TCP connection. The connection request can comprise a connection identifier that identifies a source (i.e., client) port, a source address, a destination (i.e., server) port, a destination address, and a connection protocol. The flow continues at block 304.

It is determined, based on the connection identifier in the connection request, whether a previous instance of the connection is in a wait state (304). For example, the server connection unit 108 determines whether the previous instance of the connection is in the wait state. The server connection unit 108 can read the connection identifier (i.e., the source port, the source address, the destination port, the destination address, and the connection protocol) from the connection request. The server connection unit 108 can compare the connection identifier determined from the connection request with connection identifiers of connections that are currently in the wait state. In one example, the server connection unit 108 can maintain a data structure that comprises the connection identifiers of the connections that are currently in the wait state. In this example, the server connection unit 108 can traverse the data structure to determine whether the connection identifier of the connection request matches any of the connection identifiers of the connections that are in the wait state. If a match for the connection identifier received in the connection request is identified in the data structure, a previous instance of the connection represented by the connection identifier is deemed to be in the wait state. If it is determined that the previous instance of the connection is in the wait state, the flow continues at block 308. Otherwise, the flow continues at block 306.

A connection between the client and the server is established (306). For example, the server connection unit 108 establishes the connection between the server 106 and the client 102 on determining that a previous instance of the connection is not in the wait state. The server connection unit 108 and a client connection unit 104 can execute a three-way handshaking process to establish the connection, between the sever 106 and the client 102, with the connection identifier indicated in the connection request. From block 306, the flow ends.

An acknowledgement message is generated to indicate that the previous instance of the connection represented by the connection identifier is in the wait state (308). The flow moves from block 304 to block 308 if the server connection unit 108 determines that the previous instance of the connection is in the wait state. In one implementation, in typical 3-way TCP connection establishment handshake between the client 102 and the server 106, the acknowledgement message may be a SYN-ACK message transmitted in response to the SYN message (received at block 302). The acknowledgement message can comprise wait state parameters and connection parameters of the previous instance of the connection ("previous connection parameters"). In one implementation, on determining that the connection identifier determined from the connection request matches one of the connection identifiers of the connections in the wait state (as described in block 304), corresponding wait state parameters (determined in FIG. 2) and corresponding previous connection parameters (stored at block 208 of FIG. 2) can be identified.

Figure 4:
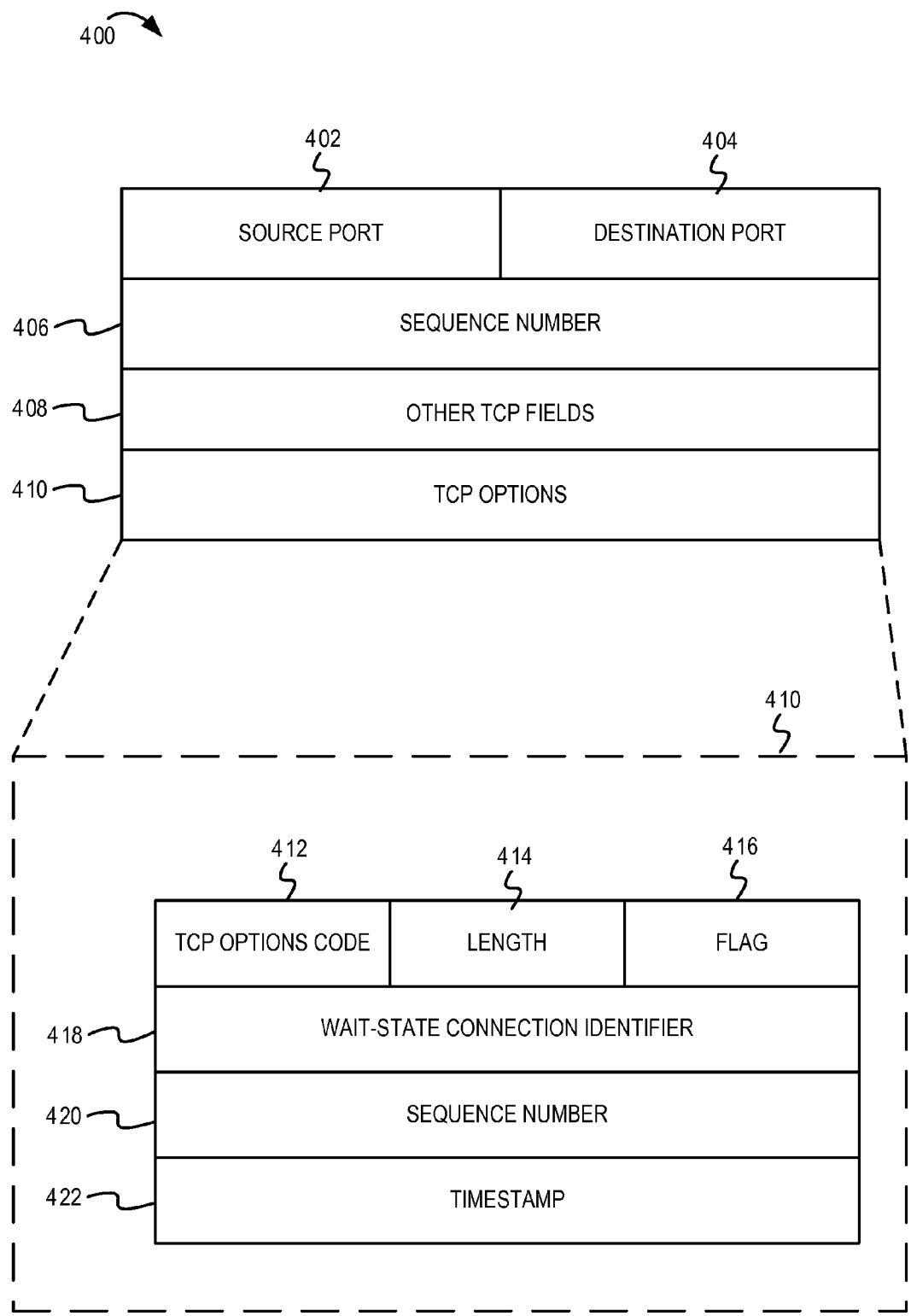
FIG. 4 depicts an example format of a message exchanged during a TCP connection process.

FIG. 4 depicts an example format of a message exchanged during a TCP connection process. With reference to FIG. 3, FIG. 4 can represent an example format 400 of the acknowledgement message. The acknowledgement message may be a TCP message comprising a source port field 402, a destination port field 404, a sequence number field 406, other TCP fields 408, and a TCP options field 410. In this case, the source port field 402 can comprise a source port number of the client 102, the destination port field 404 can comprise a destination port number of the server 106, and the sequence number field 406 may be an initial sequence number or may be determined by incrementing a last received sequence number. The TCP message may or may not comprise a timestamp field. If the TCP message comprises the timestamp, a second TCP options field (not shown) can be used to communicate presence of the timestamp. In one example, a TCP option code of "8" can be transmitted to communicate the presence of the timestamp in the TCP message. The server connection unit 108 can use the TCP options field 410 to indicate that the previous instance of the connection associated with the connection identifier is in the wait state. The TCP options field 410 comprises a TCP options code 412, a length field 414, a flag 416, a wait state connection identifier 418, a sequence number field 420, and a timestamp field 422. The TCP options code 412, the length field 414, a flag 416, and the wait state connection identifier 418 together can be defined to constitute the wait-state parameters. The sequence number field 420 and the timestamp field 422 together can be defined to constitute the connection parameters. In one implementation, the TCP options code 412 may be a predetermined combination of letters, numbers, etc. used to indicate subsequent fields comprise the wait state parameters and the previous connection parameters. Also, as described above in FIG. 2, the wait state connection identifier 418 may be a random number that is generated and is associated with the connection identifier to indicate that the previous instance of the connection is in the wait state. Furthermore, in one implementation, the length field 414 may comprise a value of "16" to indicate that the TCP options field 410 comprises 16 bytes and the flag 416 may be set to "1" to indicate that the previous instance of the connection is in the wait state. The previous sequence number can represent a last sequence number transmitted by the client 102 and the previous timestamp can represent the last timestamp of a message exchanged with the client 102 via the previous instance of the connection. It is noted that in other implementations, the number of fields, the length of the fields, and the values in the fields can vary. For example, the length field 414 and the flag 416 can comprise any suitable values. Referring back to FIG. 3, the flow continues at block 310.

The acknowledgement message is transmitted to the client (310). For example, the server connection unit 108 transmits the acknowledgement message to the client 102. In one implementation, to establish a TCP connection, the server connection unit 108 may transmit a SYN-ACK message to the client 102. The SYN-ACK message may be in the format 400 depicted in FIG. 4 and can comprise the wait state parameters and the previous connection parameters. From block 310, the flow ends.

Figure 5:
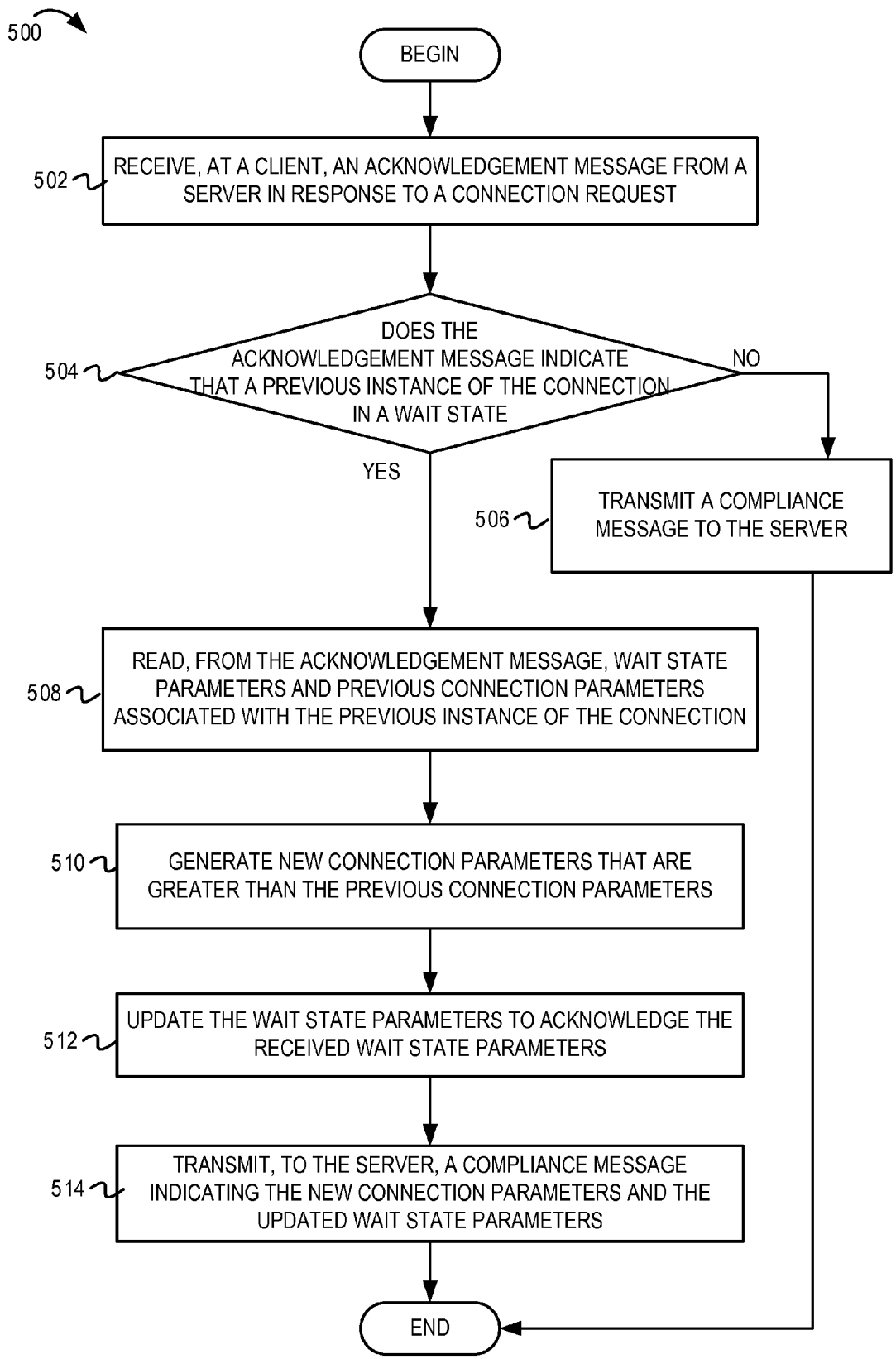
FIG. 5 is a flow diagram illustrating example operations of a client for establishing a connection with a server.

FIG. 5 is a flow diagram 500 illustrating example operations of a client for establishing a connection with a server. The flow 500 begins at block 502.

An acknowledgement message is received at a client in response to a connection request transmitted from the client to a server (502). For example, a client connection unit 104 of FIG. 1 receives the acknowledgement message (transmitted at block 310 of FIG. 3) from the server 106. In one implementation, if the client 102 is establishing a TCP connection with the server 106, the client connection unit 104 can receive a SYN-ACK message from the server 106. The flow continues at block 504.

At block 504, it is determined whether the acknowledgement message indicates that a previous instance of the connection in a wait state. For example, the client connection unit 104 can receive the SYN-ACK message in the message format 400 of FIG. 4 and can read the TCP options code 412 to determine whether the SYN-ACK message comprises wait state parameters. The client connection unit 104 can read the flag 416 to determine whether the previous instance of the connection in the wait state. For example, if the value of the flag 416 is "1", the client connection unit 104 can determine that the previous instance of the connection in the wait state. If the flag 416 is not equal to the predetermined flag value (e.g., the flag 416 does not have a value of "1") the client connection unit 104 can determine that the previous instance of the connection is not in the wait state. If it is determined that the acknowledgement message indicates that the previous instance of the connection is in the wait state, the flow continues at block 508. Otherwise, the flow continues at block 506.

A compliance message is transmitted to the server (506). For example, the client connection unit 104 transmits the compliance message to the server 106 on determining that the acknowledgement message indicates that the previous instance of the connection is not in the wait state. To establish a TCP connection with the server 106, on receiving a SYN-ACK message from the server 106, the client connection unit 104 can transmit an ACK message to the server 106 as part of 3-way connection establishment handshake operations. The ACK message transmitted at block 506 would not comprise the TCP options field 410 including updated wait state parameters and new connection parameters because the client connection unit 104 determined that the previous instance of the connection is not in the wait state. Subsequently, the connection between the server 106 and the client 102 can be established. From block 506, the flow ends.

The wait state parameters and previous connection parameters associated with the previous instance of the connection are read from the acknowledgement message (508). For example, the client connection unit 104 reads the wait state parameters and the previous connection parameters from the acknowledgement message. With reference to FIG. 4, the client connection unit 104 can read the previous sequence number 420 and the previous timestamp 422 associated with the previous instance of the connection from the acknowledgment message received from the server 106. The flow continues at block 510.

New connection parameters that are greater than the previous connection parameters are generated (510). For example, the client connection unit 104 generates the new connection parameters that are greater than the previous connection parameters. The client connection unit 104 generates a new initial sequence number (ISN) and a new timestamp based on the previous sequence number and the previous timestamp, respectively, received in the acknowledgement message. As described above, the sequence number is incremented for every packet that is transmitted via the connection. The sequence number is incremented from an ISN that is agreed upon by the server 106 and the client 102 during a connection establishment process. The client connection unit 104 can generate the new ISN that is greater than the previous sequence number. In other words, the client connection unit 104 can generate the new ISN that is greater than a last sequence number transmitted using the previous instance of the connection. In one implementation, the new ISN can be randomly generated (e.g., using a randomization algorithm) and the new ISN that is greater than the previous sequence number can be selected. In another implementation, the new ISN can be determined by incrementing the previous sequence number (e.g., by a suitable increment). If timestamps are to be used, the client connection unit 104 can generate a new timestamp that is greater than a timestamp of the last message exchanged via the previous instance of the connection. The flow continues at block 512.

The wait state parameters are updated to acknowledge the received wait state parameters (512). For example, the client connection unit 106 updates the wait state parameters to acknowledge the received wait state parameters and to yield updated wait state parameters. As described above, the wait state parameters received in the acknowledgement message from the server 106 comprise the TCP options code 412, the flag 416, and the wait state connection identifier 418. The client connection unit 104 can store the wait state connection identifier 418. The client connection unit 104 can update the flag 416 to a second predetermined value to acknowledge receipt of the wait state parameters from the server 106. In one example, the client connection unit 104 can update the flag 416 to "2" to acknowledge receipt of the wait state parameters from the server 106. In another example, the client connection unit 104 can transmit any suitable predetermined value to acknowledge receipt of the wait state parameters from the server 106. The client 102 can also retransmit the wait state connection identifier received from the server 106 to confirm the connection identifier that represents the connection to be established. The flow continues at block 514.

A compliance message indicating the new connection parameters and the updated wait state parameters is transmitted to the server (514). For example, the client connection unit 104 transmits, to the sever 106, the compliance message indicating the new connection parameters and the updated wait state parameters. To establish a TCP connection, the client connection unit 104 can transmit an ACK message as the compliance message to the server 106 to confirm receipt of a SYN-ACK message received from the server 106 at block 502. The ACK message may be of the format 400 of FIG. 4 and can comprise the TCP options field 410 of FIG. 4 including the updated wait state parameters (determined at block 512) and the new connection parameters (determined at block 510). In one implementation, the TCP options field 410 can be populated such that the TCP options code 412 comprises a value transmitted by the server in the SYN-ACK message (at block 310 of FIG. 3), the value of the flag 416 is "2" to indicate receipt of the wait state parameters from the server 106, and the wait state connection identifier 418 comprises the wait state connection identifier transmitted by the server in the SYN-ACK message (at block 310 of FIG. 3). The TCP options field 410 can be populated such that the sequence number field 420 comprises the new sequence number determined at block 512 and the timestamp field 422 comprises the new timestamp determined at block 512. From block 514, the flow ends.

It is noted that although FIG. 5 describes the client connection unit 104 reading the flag 416 to determine whether the previous instance of the connection is in the wait state, embodiments are not so limited. In some implementations, the presence of the wait state parameters can indicate that the previous instance of the connection in the wait state. The absence of the wait state parameters can indicate that the previous instance of the connection in not the wait state. In another implementation, the client connection unit 104 can read the TCP options code 412 and compare the TCP options code 412 against a predetermined code to determine whether the previous instance of the connection in the wait state. If the TCP options code 412 is not equal to the predetermined code, the client connection unit 104 can determine that the previous instance of the connection is not in the wait state. Furthermore, as part of the compliance message, in one implementation, the client connection unit 104 can update the TCP options code 412 to acknowledge receipt of the wait state parameters from the server 106. In another implementation, the client connection unit 104 may not update the TCP options code 412 and may instead retransmit the TCP options code 412 received from the server 106.

Figure 6:
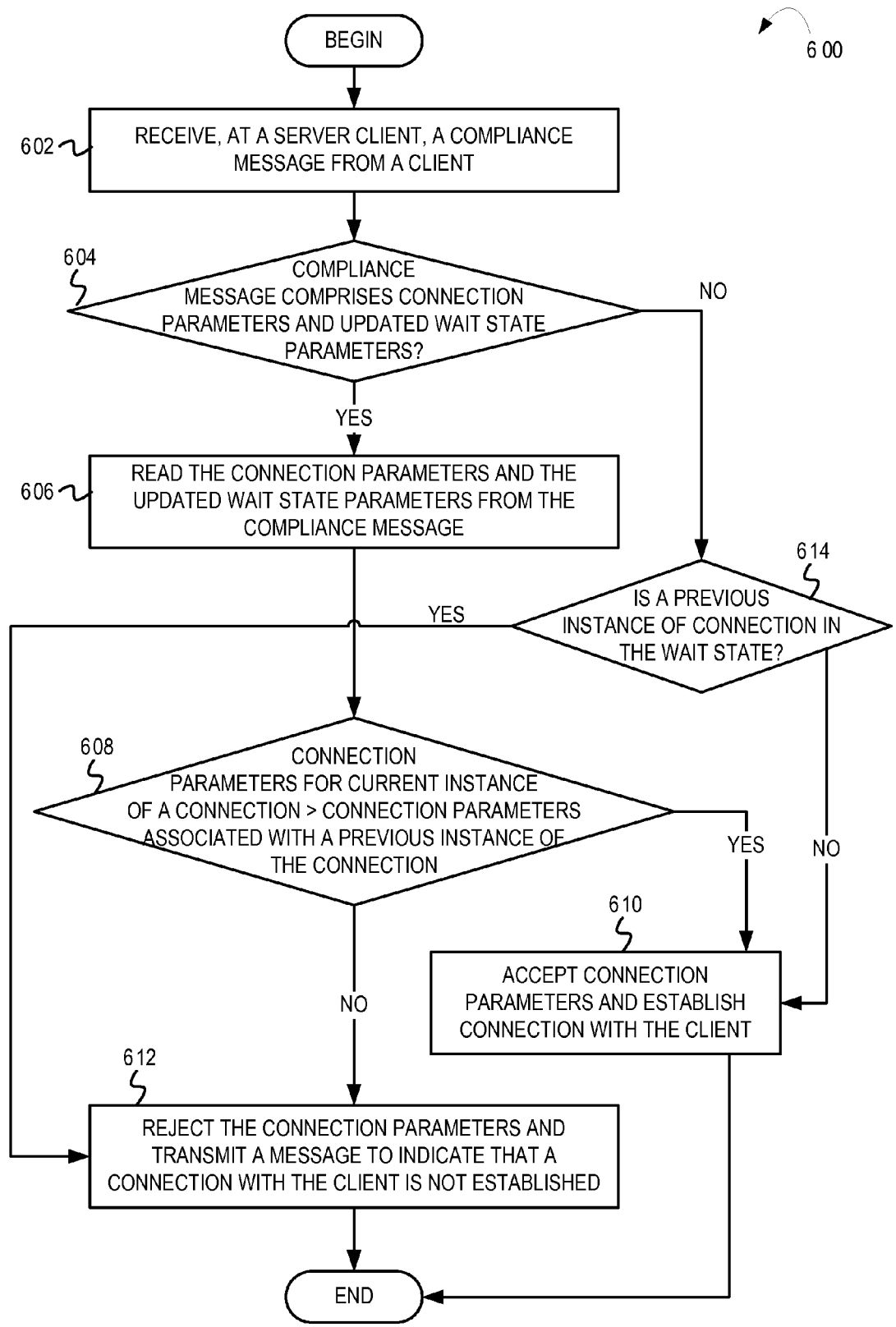
FIG. 6 is a flow diagram illustrating example operations of a server for establishing a connection with a client using a connection identifier in a wait state.

FIG. 6 is a flow diagram 600 illustrating example operations of a server for establishing a connection with a client using a connection identifier in a wait state. The flow 600 begins at block 602

A compliance message is received at a server from a client (602). For example, the server connection unit 108 of FIG. 1 receives the compliance message from the client 102. For establishing a TCP connection, the server 106 may receive an ACK message as the compliance message from the client 102. The flow continues at block 604.

It is determined whether the compliance message comprises connection parameters and updated wait state parameters (604). For example, for a TCP connection, on receiving the ACK message from the client 102, the server connection unit 108 can determine whether the client 102 has acknowledged receipt of wait state parameters previously transmitted by the server connection unit 108 in a SYN-ACK message (at block 310 of FIG. 3). For this, the server connection unit 108 can determine whether a TCP options field 410 was transmitted in the ACK message. Based on the flag 416 and/or the TCP options code 412 of the TCP options field 410, the server connection unit 108 can determine whether the ACK message comprises the updated wait state parameters and the connection parameters. If it is determined that compliance message comprises the connection parameters and the updated wait state parameters, the flow continues at block 606. Otherwise, the flow continues at block 614.

The connection parameters and the updated wait state parameters are read from the compliance message (606). For example, the server connection unit 108 reads the connection parameters and the updated wait state parameters from the compliance message. The server connection unit 108 can read a wait state connection identifier 418 from the TCP options field 410 of the ACK message and can identify a connection identifier with which the wait state connection identifier is associated. Based on the wait state connection identifier, the server connection unit 108 can also identify previous connection parameters associated with a previous instance of the connection. Additionally, the server connection unit 108 can read the connection parameters including the initial sequence number and the timestamp for the current instance of a connection (i.e., the new ISN and the new timestamp determined at block 510 of FIG. 5) ("new connection parameters") proposed by the client 102. The flow continues at block 608.

It is determined whether the new connection parameters are greater than the previous connection parameters (608). For example, the server connection unit 108 determines whether the new connection parameters are greater than the previous connection parameters. If it is determined that the new connection parameters are greater than the previous connection parameters, the flow continues at block 610. Otherwise, the flow continues at block 612.

It is determined whether the previous instance of the connection is in the wait state (614). The flow 600 moves from block 604 to block 614 on determining that the compliance message does not comprise the new connection parameters and the updated wait state parameters. For example, the server connection unit 108 determines, based on the connection identifier of the connection, whether the previous instance of the connection is in the wait state. The compliance message may not comprise the updated wait state parameters and the connection parameters if the client 102 was unable to recognize the TCP options code 412 and the wait state parameters transmitted by the server 106 in the acknowledgement message. If the compliance message does not comprise the TCP options field 410, the server connection unit 108 can determine the connection identifier from the compliance message and can determine whether there exists a wait state connection identifier associated with the connection identifier. If so, the server connection unit 108 determines that the previous instance of the connection is in the wait state and that the client 102 does not support the wait state code and the wait state parameters. If it is determined that the previous instance of the connection is in the wait state, the flow continues at block 612. Otherwise, the flow continues at block 610.

The new connection parameters are accepted and the connection is established with the client (610). The flow 600 moves from block 608 to block 610 on determining that the new connection parameters are greater than the previous connection parameters. The server connection unit 108 can accept the new connection parameters by overwriting the previous sequence number with the new ISN and by overwriting the previous timestamp with the new timestamp. The server connection unit 108 can then establishes the connection between the server 106 and the client 102 with the same connection identifier as that of the previous instance of the connection. It is noted that the connection represented by the same connection identifier as that of the previous instance of the connection is established irrespective of whether a time wait interval of the previous instance of the connection is elapsed. The flow 600 also moves from block 614 to block 610 on determining that the previous instance of the connection is not in the wait state. The server connection unit 108 can establish the connection, represented by the connection identifier, between the server 106 and the client 102. It is noted that if TCP messages associated with the previous instance of the connection are received at the server 106 after the connection is established at block 610, the TCP messages associated with the previous instance of the connection will be discarded because the TCP messages do not comply with the new ISN and the new timestamp. From block 610, the flow ends.

The connection parameters received in the compliance message are rejected and a message indicating that a connection with the client cannot be established is transmitted to the client (612). The flow 600 moves from block 608 to block 610 if it is determined that the new connection parameters are not greater than the previous connection parameters. The flow 600 also moves from block 614 to block 610 on determining that the previous instance of the connection is in the wait state. At block 612, the server connection unit 108 can reject (or discard) the connection parameters received in the compliance message. The server connection unit 108 can then transmit a message (e.g., a RST message) indicating that the connection between the server 106 and the client 102 cannot be established. From block 612, the flow ends.

It should be understood that the depicted diagrams (FIGS. 1-6) are examples meant to aid in understanding embodiments and should not be used to limit embodiments or limit scope of the claims. Embodiments may perform additional operations, fewer operations, operations in a different order, operations in parallel, and some operations differently. For example, although FIGS. 1-6 describe the server connection unit 108 transmitting the previous timestamp associated with a last packet transmitted via the previous instance of the connection and the client connection unit 104 generating a new timestamp, for the current instance of the connection, that is greater than the previous timestamp, embodiments are not so limited. In some implementations, sequence numbers may be transmitted as part of the messages (e.g., SYN, SYN-ACK, and ACK messages) exchanged between the client 102 and the server 106 but the timestamp may not be transmitted as part of the messages exchanged between the client 102 and the server 106. In this embodiment, the timestamp field 422 of the TCP options field 410 of FIG. 4 may not have any value (e.g., the TCP options field 410 may be transmitted without the timestamp field 422) or may have a predefined value (e.g., all zeros) that indicates that timestamps are not in use.

Also, as part of the acknowledgment message (transmitted at block 310 of FIG. 3) the server connection unit 108 can propose new connection parameters. For example, as part of the acknowledgement message, the server connection unit 108 can transmit a proposed sequence number in the sequence number field 406 of FIG. 4 and can transmit a proposed timestamp value as part of the other TCP fields 408. In some implementations, as described above, the client connection unit 104 may generate the new connection parameters that are different from the proposed connection parameters transmitted by the server connection unit 108. In other implementations, however, the client connection unit 104 can simply accept the proposed connection parameters and can transmit a subsequent message (i.e., the compliance message transmitted at block 514 of FIG. 5) in accordance with the proposed connection parameters. For example, if the client connection unit 104 accepts the proposed sequence number received in the acknowledgement message, the client connection unit 104 can increment the proposed sequence number by 1 (or another predefined increment) and can transmit the incremented proposed sequence number as part of the new sequence number 420 in the compliance acknowledgement message.

Although the operations described in FIGS. 1-6 depict the client 102 initiating the operations for closing the connection and the server 106 actively closing the connection and moving the connection to the wait state, embodiments are not so limited. In some embodiments, the server 106 can initiate operations for terminating the connection with the client 102 or the client 102 can determine to close the connection. In this embodiment, the client 102 can actively close the connection and can move the connection to the wait state. The connection would be considered to be closed (e.g., in a CLOSED state) on the server 106, while the connection would be moved to the wait state (e.g., in a TIME_WAIT state) on the client 102. The client 102 can reuse the same connection identifier (i.e., the connection identifier of a previous instance of the connection in the wait state) to establish a new instance of the connection. In other words, the client 102 can initiate a new instance of the connection represented by the connection identifier (e.g., client port, client address, server port, server address, connection protocol), even though the previous instance of the connection represented by the connection identifier is in the wait state at the client 102. To initiate a new instance of the connection in the wait state, the client 102 should ensure that the ISN of the new instance of the connection is greater than a last sequence number of the previous instance of the connection. If timestamps are used as part of messages exchanged between the client 102 and the server 106, the client 102 should also ensure that the timestamp of the new instance of the connection is greater than a last timestamp exchanged via the previous instance of the connection.

Furthermore, although FIGS. 1-6 describe the client connection unit 104 and the server connection unit 108 transmitting the wait state parameters and the connection parameters as part of the TCP options field 410 of FIG. 4, embodiments are not so limited. In other implementations, reserved bits in TCP headers may also be used to transmit the wait state parameters and the connection parameters. For example, in the SYN-ACK message (transmitted at block 310), one of the bits of unused TCP flags can be used to indicate whether the previous instance of the connection is in the wait state. The wait state connection identifier, the previous sequence number, and the previous timestamp can be transmitted in a TCP data field. Likewise, in the ACK message (transmitted at block 514), the same bit of the unused TCP flags can be used to acknowledge that the previous instance of the connection is in the wait state. The wait state connection identifier, the new sequence number, and the new timestamp can be transmitted in a TCP data field.

By transmitting the wait state parameters and the connection parameters as part of the TCP options field 410, backwards compatibility with legacy clients that do not support the wait state parameters (and the operations described herein) can be maintained. On receiving the SYN-ACK message comprising the TCP options field 410, a legacy client may ignore the TCP options field 410 (e.g., because the legacy client does not recognize the wait state code 412), process the SYN-ACK message, and transmit the ACK message without the TCP options field 410 and thus without acknowledging that the previous instance of the connection is in the wait state. On receiving the ACK message without the TCP options field 410, the server 106 can determine that the client is a legacy client and can consequently reject the connection with the legacy client because the previous instance of the connection is in the wait state. Likewise, if the client hosts an operating system that does not support execution of the operations described herein, the server 106 can determine that the client does not support execution of the operations described herein (as described above) and can consequently reject the connection with the client aborting handshaking operations for connection establishment.

As will be appreciated by one skilled in the art, aspects of the present inventive subject matter may be embodied as a system, method, or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
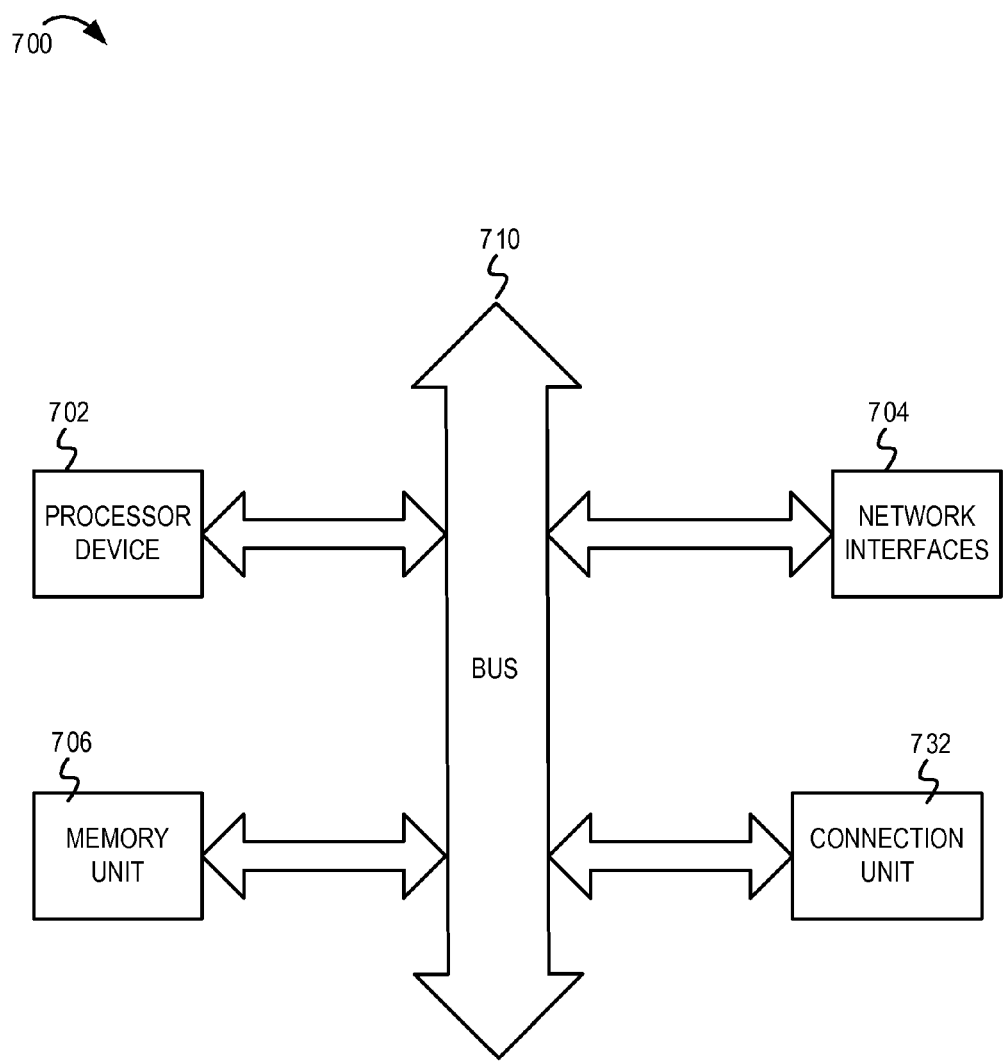
FIG. 7 is a block diagram of one embodiment of a computer system including a mechanism for mitigating connection identifier collisions.

FIG. 7 is a block diagram of one embodiment of a computer system 700 including a mechanism for mitigating connection identifier collisions. The computer system may be a personal computer, a laptop, a server, or other machine that can communicate and exchange information in a client-server network. The computer system 700 includes a processor unit 702 (possibly including multiple processors, multiple cores, multiple nodes, and/or implementing multi-threading, etc.). The computer system 700 includes a memory unit 706. The memory unit 706 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system 700 also includes a bus 710 (e.g., PCI, ISA, PCI-Express, HyperTransport®, Infini-Band®, NuBus, AHB, AXI, etc.), and network interfaces 704 that include one or more of a wireless network interface (e.g., a WLAN interface, a Bluetooth® interface, a WiMAX interface, a ZigBee® interface, a Wireless USB interface, etc.) and a wired network interface (e.g., an Ethernet interface, an optical fiber interface, powerline network interface, etc.).

The computer system 700 also includes a connection unit 732. When implemented on a server, the connection unit 732 can determine that a connection identifier of a connection request is in a wait state, transmit wait state parameters as an indication of the connection identifier being in the wait state to a client that transmitted the connection request, and can establish a new connection with the client using the same connection identifier if the client recognizes the wait state parameters, as described with reference to FIGS. 1-3 and 6. When implemented on a client, the connection unit 732 can receive the wait state parameters from the server and generate appropriate connection parameters for a new instance of the connection, as described with reference to FIGS. 1 and 5.

In some embodiments, the computer system 700 can include additional devices and/or more than one of each component shown in FIG. 7 (e.g., video cards, audio cards, peripheral devices, etc.). For example, in some instances, the computer system 700 may include multiple processor units, multiple cores, multiple external CPU's. In other instances, components may be integrated or subdivided. Any one of these functionalities may be partially (or entirely) implemented in hardware and/or on the processor unit 702. For example, the functionality may be implemented with an application specific integrated circuit, in logic implemented in the processor unit 702, in a co-processor on a peripheral device or card, etc. Further, realizations may include fewer or additional components not illustrated in FIG. 7 (e.g., video cards, audio cards, additional network interfaces, peripheral devices, etc.).

Figure 8:
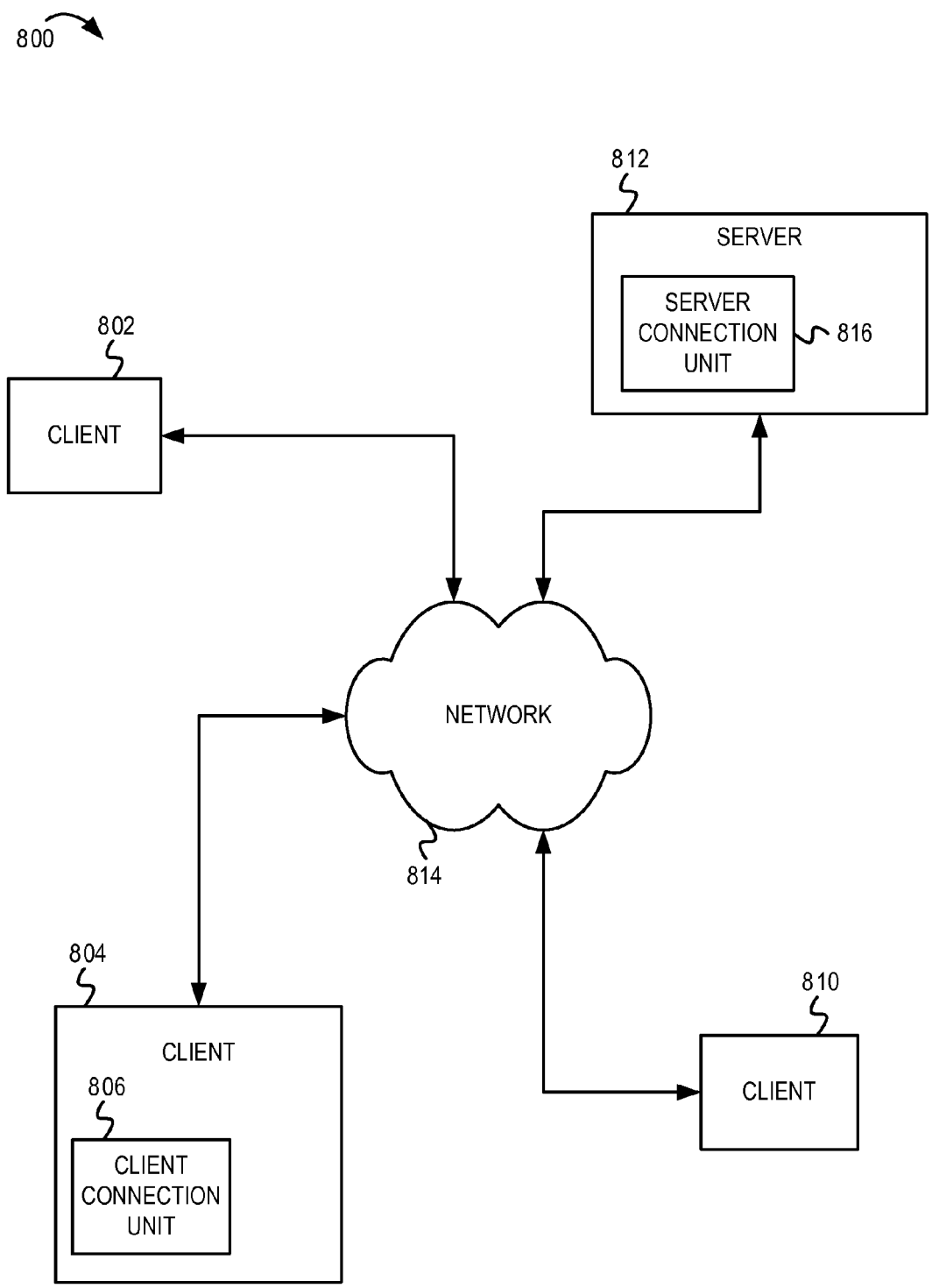
FIG. 8 is an example block diagram illustrating a system configured for establishing a new connection using a connection identifier in a wait state.

FIG. 8 is an example block diagram illustrating a system 800 configured for mitigating connection identifier collisions in a communication network. The system 800 comprises a server 812 and clients 802, 804, and 810. The server 812 comprises a server connection unit 816, while each of the clients 804 comprises a client connection unit 806.

As described above with reference to FIGS. 1-6, the server connection unit 812 receives a request to terminate a TCP connection between the server 812 and the client 804. On terminating the TCP connection, the client 804 considers the TCP connection to be in a "CLOSED" state, while the server 812 maintains a connection identifier of the TCP connection in a TIME_WAIT state for a pre-determined time interval.

The server connection unit 108 receives a connection request (e.g., a SYN message) for establishing a connection between the client 804 and the server 812. Based on the connection identifier indicated in the connection request, the server connection unit 816 determines that a previous instance of the connection is in the TIME_WAIT state. The server connection unit 816 transmits an acknowledgement message (e.g., a SYN_ACK message) comprising wait state parameters and previous connection parameters associated with the previous instance of the connection that is in the wait state. In response, the client connection unit 806 generates new connection parameters that are greater than the previous connection parameters. The client connection unit 806 also updates the wait state parameters to acknowledge receipt of the wait state parameters. The client connection unit 806 transmits a compliance message (e.g., an ACK message) indicating the updated wait state parameters and the new connection parameters. On verifying the updated wait state parameters and determining that the new connection parameters are greater than the previous connection parameters, the server connection unit 816 overwrites the previous connection parameters with the new connection parameters. The server connection unit 816 then establishes the connection between the server 812 and the client 804 using the same connection identifier irrespective of whether the pre-determined time interval is elapsed.

The server 812 communicates with the clients 802, 804, and 810 via a communication network 814. The communication network 814 can include any technology (e.g., Ethernet, IEEE 802.11n, SONET, etc) suitable for passing communication between the server 812 and the clients 802, 804, and 810. Moreover, the communication network 814 can be part of other networks, such as cellular telephone networks, public-switched telephone networks (PSTN), cable television networks, etc. Additionally, the server 812 and the clients 802, 804, and 810 can be any suitable devices capable of executing software in accordance with the embodiments described herein.

While the embodiments are described with reference to various implementations and exploitations, it will be understood that these embodiments are illustrative and that the scope of the inventive subject matter is not limited to them. In general, techniques for mitigating connection identifier collisions as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   after determining that a connection will be or has been set to a wait state, generating a value and associating the value with a connection identifier that identifies the connection;
   associating a last timestamp and a last sequence number of the connection with the association of the generated value and the connection identifier;
   after generating the value and associating the value with the connection identifier, determining, based on the connection identifier in a connection request received at a server from a client after the connection was set to the wait state, that a previous instance of the connection identified by the connection identifier is in the wait state, wherein the association of the value and the connection identifier identifies the previous instance of the connection;
   determining wait state parameters associated with the connection identifier and original connection parameters associated with the previous instance of the connection in the wait state, wherein the original connection parameters include the last sequence number and the last timestamp and the wait state parameters include the association of the value and the connection identifier;
   providing an acknowledgement message from the server to the client that comprises the wait state parameters and the original connection parameters;
   receiving, in response to the acknowledgement message, a compliance message at the server from the client that comprises updated wait state parameters and updated connection parameters; and
   establishing, with the client, a new instance of the connection identified by the connection identifier, wherein the new instance of the connection is established based, at least in part, on the updated wait state parameters and the updated connection parameters.

2. The method of claim 1, wherein the connection identifier identifies a port of the client that represents a first end point of the connection that is represented by the connection identifier, a port of the server that represents a second end point of the connection that is represented by the connection identifier, an address of the client, an address of the server, and a connection protocol.

3. The method of claim 1, wherein the wait state parameters further comprise a flag that indicates that the previous instance of the connection identified by the association of the value and the connection identifier is in the wait state.

4. The method of claim 1, wherein the updated wait state parameters comprise a flag that indicates acknowledgement that the previous instance of the connection identified by the association of the value and the connection identifier is in the wait state.

5. The method of claim 1, further comprising:
   determining whether the updated connection parameters are greater than the original connection parameters;
   accepting the updated connection parameters for said establishing the new instance of the connection represented by the connection identifier if the updated connection parameters are greater than the original connection parameters; and
   rejecting the new instance of the connection represented by the connection identifier if the updated connection parameters are not greater than the original connection parameters.

6. The method of claim 1, further comprising:
   determining, at the server, whether the updated wait state parameters comprise a flag that indicates acknowledgement that the previous instance of the connection identified by the association of the value and the connection identifier is in the wait state;
   accepting the updated connection parameters for said establishing the new instance of the connection represented by the connection identifier if the updated wait state parameters comprise the flag that indicates acknowledgement that the previous instance of the connection is in the wait state; and rejecting the new instance of the connection represented by the connection identifier if the updated wait state parameters do not comprise the flag that indicates acknowledgement that the previous instance of the connection is in the wait state.

7. The method of claim 1, wherein the updated wait state parameters indicate whether the client acknowledged that the previous instance of the connection identified by the association of the value and the connection identifier is in the wait state.

8. A computer program product for mitigating connection identifier collisions, the computer program product comprising:

a non-transitory computer readable storage medium having computer usable program code embodied therewith, the computer readable program code comprising computer readable program code to, after a determination that a connection will be or has been set to a wait state, generate a value and associate the value with a connection identifier that identifies the connection;

associate a last timestamp and a last sequence number of the connection with the association of the generated value and the connection identifier;

after generation of the value and association of the value with the connection identifier, determine, based on the connection identifier in a connection request received from a client after the connection was set to the wait state, that a previous instance of the connection identified by the connection identifier is in the wait state, wherein the association of the value and the connection identifier identifies the previous instance of the connection;

determine wait state parameters associated with the connection identifier and original connection parameters associated with the previous instance of the connection in the wait state, wherein the original connection parameters include the last sequence number and the last timestamp and the wait state parameters include the association of the value and the connection identifier;

provide, to the client, an acknowledgement message that comprises the wait state parameters and the original connection parameters;

receive, in response to the acknowledgement message, a compliance message from the client that comprises updated wait state parameters and updated connection parameters; and establish, with the client, a new instance of the connection identified by the connection identifier, wherein the new instance of the connection is established based, at least in part, on the updated wait state parameters and the updated connection parameters.

9. The computer program product of claim 8, wherein the connection identifier identifies a port of the client that represents a first end point of the connection that is represented by the connection identifier, a port of a server that represents a second end point of the connection that is represented by the connection identifier, an address of the client, an address of the server, and a connection protocol.

10. The computer program product of claim 8, wherein the computer readable program code is further configured to:

determine whether the updated connection parameters are greater than the original connection parameters;

accept the updated connection parameters for establishing the new instance of the connection represented by the connection identifier if the updated connection parameters are greater than the original connection parameters; and reject the new instance of the connection represented by the connection identifier if the updated connection parameters are not greater than the original connection parameters.

11. The computer program product of claim 8, wherein the computer readable program code is further configured to:

determine whether the updated wait state parameters comprise a flag that indicates acknowledgement that the previous instance of the connection identified by the association of the value and the connection identifier is in the wait state;

accept the updated connection parameters for establishing the new instance of the connection represented by the connection identifier if the updated wait state parameters comprise the flag that indicates acknowledgement that the previous instance of the connection identified by the association of the value and the connection identifier is in the wait state; and reject the new instance of the connection represented by the connection identifier if the updated wait state parameters do not comprise the flag that indicates acknowledgement that the previous instance of the connection identified by the association of the value and the connection identifier is in the wait state.

12. A communication network device comprising:

a processor;

a network interface coupled with the processor; and a connection unit coupled with the processor and with the network interface, the connection unit operable to, after a determination that a connection will be or has been set to a wait state, generate a value and associate the value with a connection identifier that identifies the connection;

associate a last timestamp and a last sequence number of the connection with the association of the generated value and the connection identifier;

after generation of the value and association of the value with the connection identifier, determine, based on the connection identifier in a connection request received at the communication network device from a second communication network device after the connection was set to the wait state, that a previous instance of the connection represented by the connection identifier is in the wait state, wherein the association of the value and the connection identifier identifies the previous instance of the connection;

determine wait state parameters associated with the connection identifier and original connection parameters associated with the previous instance of the connection in the wait state, wherein the original connection parameters include the last sequence number and the last timestamp and the wait state parameters include the association of the value and the connection identifier;

provide an acknowledgement message that comprises the wait state parameters and the original connection parameters from the communication network device to the second communication network device;

receive, in response to the acknowledgement message, a compliance message at the communication network device from the second communication network device that comprises updated wait state parameters and updated connection parameters; and establishing, with the second communication network device, a new instance of the connection identified by the connection identifier, wherein the new instance of the connection is established based, at least in part, on the updated wait state parameters and the updated connection parameters.

13. The communication network device of claim 12, wherein the connection unit is further operable to:

determine whether the updated connection parameters are greater than the original connection parameters;

accept the updated connection parameters for establishing the new instance of the connection represented by the connection identifier if the updated connection parameters are greater than the original connection parameters; and reject the new instance of the connection represented by the connection identifier if the updated connection parameters are not greater than the original connection parameters.

14. The communication network device of claim 12, wherein the connection unit is further operable to:

determine whether the updated wait state parameters comprise a flag that indicates acknowledgement that the previous instance of the connection identified by the association of the value and the connection identifier is in the wait state;

accept the updated connection parameters for establishing the new instance of the connection represented by the connection identifier if the updated wait state parameters comprise the flag that indicates acknowledgement that the previous instance of the connection identified by the association of the value and the connection identifier is in the wait state; and reject the new instance of the connection represented by the connection identifier if the updated wait state parameters do not comprise the flag that indicates acknowledgement that the previous instance of the connection identified by the association of the value and the connection identifier is in the wait state.

* * * * *